US006983265B2

(12) United States Patent
Tannhof et al.

(10) Patent No.: US 6,983,265 B2
(45) Date of Patent: Jan. 3, 2006

(54) METHOD TO IMPROVE THE DATA TRANSFER RATE BETWEEN A COMPUTER AND A NEURAL NETWORK

(75) Inventors: Pascal Tannhof, Fontainebleau (FR); Ghislain Imbert de Tremiolles, Vence (FR)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 10/316,250

(22) Filed: Dec. 10, 2002

(65) Prior Publication Data

US 2003/0135475 A1   Jul. 17, 2003

(30) Foreign Application Priority Data

Dec. 21, 2001   (EP) .................................. 01480142

(51) Int. Cl.
   *G06N 3/06*   (2006.01)
(52) U.S. Cl. .............................. 706/26; 706/26; 706/27
(58) Field of Classification Search .................. 706/26, 706/27

See application file for complete search history.

(56) References Cited

U.S. PATENT DOCUMENTS

| | | | |
|---|---|---|---|
| 5,056,015 A * | 10/1991 | Baldwin et al. ............... | 703/27 |
| 5,581,778 A * | 12/1996 | Chin et al. ..................... | 712/16 |
| 5,590,356 A * | 12/1996 | Gilbert ........................... | 712/31 |
| 5,621,863 A   | 4/1997  | Boulet et al. | |
| 5,717,832 A   | 2/1998  | Steimle et al. | |
| 5,867,723 A * | 2/1999  | Chin et al. .................... | 712/11 |

OTHER PUBLICATIONS

"Implementing very high-speed hierarchical MLP-based classification systems in real-time industrial environments", R. Parenti, C. Penno, D. Baratta, F. Masulli, http://www.di-si.unige.it/person/MasulliF/papers/masulli-kes01.pdf.*
"A Prototyping Platform for Dynamically Reconfigurable System on Chip Designs", H. Kalte, M. Porrmann, U. Ruckert, Heinz Nixdorf Institute, University of Paderborn, Paderborn, German.*

* cited by examiner

*Primary Examiner*—Wilbert L. Starks
*Assistant Examiner*—Mai T. Tran
(74) *Attorney, Agent, or Firm*—H. Daniel Schnurmann

(57) ABSTRACT

A method is described to improve the data transfer rate between a personal computer or a host computer and a neural network implemented in hardware by merging a plurality of input patterns into a single input pattern configured to globally represent the set of input patterns. A base consolidated vector ($U'^*_n$) representing the input pattern is defined to describe all the vectors ($U_n, \ldots, U_{n+6}$) representing the input patterns derived thereof ($U'_n, \ldots, U'_{n+6}$) by combining components having fixed and 'don't care' values. The base consolidated vector is provided only once with all the components of the vectors. An artificial neural network (ANN) is then configured as a combination of sub-networks operating in parallel. In order to compute the distances with an adequate number of components, the prototypes are to include also components having a definite value and 'don't care' conditions. During the learning phase, the consolidated vectors are stored as prototypes. During the recognition phase, when a new base consolidated vector is provided to ANN, each sub-network analyses a portion thereof After computing all the distances, they are sorted one sub-network at a time to obtain the distances associated to each vector.

5 Claims, 4 Drawing Sheets

RECOGNITION PHASE

⊠ = "DON'T CARE"

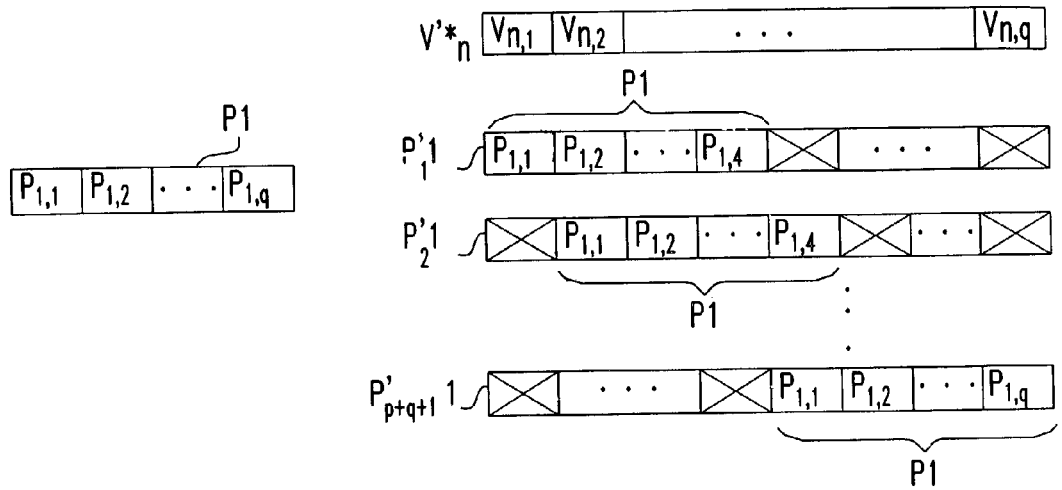
FIG. 3  ⊠="DON'T CARE"
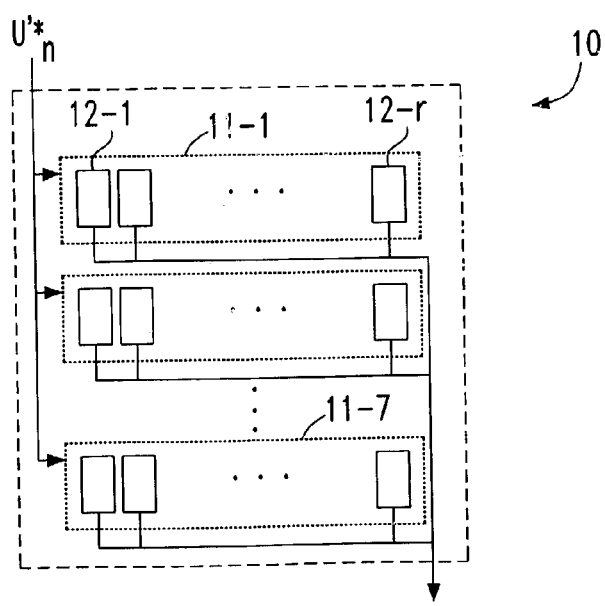
FIG. 4

METHOD TO IMPROVE THE DATA TRANSFER RATE BETWEEN A COMPUTER AND A NEURAL NETWORK

FIELD OF THE INVENTION

The present invention relates to neural network based systems and, more particularly, to a method to improve the data transfer rate between a personal computer or a host computer and a neural network implemented in hardware.

BACKGROUND OF THE INVENTION

In today's data processing, recognition, prediction, and computation tasks are performed using reference databases that characterize input data. Depending on the problem to be solved, these reference databases include patterns that are sub-images, sub-signals, subsets of data and combinations thereof. The patterns stored in the reference databases will be referred to hereinafter as prototypes. As known to practitioners of the art, they are represented generally by a vector, i.e., an array within a space of a given dimension. Well-known methods for characterizing new (unknown) patterns, referred to hereinafter as input patterns, use reference databases that are based on input space mapping algorithms, like K-Nearest-Neighbor (KNN) or Region Of Influence (ROI). The object of the basic principle of these algorithms is to compute the distance (Dist) between the input pattern and each of the stored prototypes in order to find the closest one(s) depending upon predetermined thresholds.

U.S. Pat. No. 5,717,832, of common assignee, describes neural semiconductor chips and artificial neural networks (ANNs) of a new type embedded therein. These ANNs, referred to hereinafter as ZISC ANNs, are based on the input space mapping algorithms referred above and include innovative elementary processors, known as ZISC neurons (ZISC is a registered trade mark of the International Business Machines Corporation). The ZISC neurons are described in U.S. Pat. No. 5,621,863 of common assignee. An essential characteristic of the ZISC neurons resides in their ability to work in parallel, i.e., when an input pattern is provided to ZISC ANN, all the neurons compute simultaneously the distance between the input pattern and each of the prototypes stored therein.

An important aspect of these algorithms is the distance evaluation, referred to as the "norm", that is used in the distance evaluation process. The selection of this norm is determined, on the one hand, by the problem to be solved, and on the other, by the knowledge required to solve this problem. In a ZISCO36 neuron, the distance Dist between an input pattern V and the prototype P stored therein (each represented by a vector having p components) is calculated by the Manhattan distance (Li norm), i.e., Dist=($|Vk-Pk|$)² or the Maximum distance (Lsup norm), i.e., Dist=max ($|Vk-Pk|$), wherein Vk and Pk are components of rank k (with k varying from 1 to p) for the input pattern V and the stored prototype P, respectively. In a ZISCO36 neuron, the choice between the Li or Lsup norm is determined by the value of a single bit, the "norm" bit number stored in the neuron. Thus, to evaluate the minimum distance between an input pattern and the memorized prototypes, the pattern is inputted to ZISC ANN, "elementary" distances (Dist) are computed for each component of the input pattern in each neuron, and the distances are determined according to the desired norm. Other norms exist, for instance, the L2 norm, such as Dist=$(Vk-Pk)^2$. The L2 norm is said to be "Euclidean" while the Li and Lsup norms are examples of "non-Euclidean" norms. They all require, however, computing the difference (Vk-Pk) for each component in the elementary distance evaluation. As a matter of fact, the "absolute value of a difference" operator, i.e., $|Vk-Pk|$ is extensively used in the ANN field, although other operators, such as the "match/no match" operator, also written as "match (Vk,Pk)", are better adapted to specific situations.

The notion of "context" was a novel concept introduced by the ZISC neurons. The context can be advantageously used to differentiate different types of input patterns. For instance, in the field of optical character recognition, the context may be used to distinguish between the upper case and the lower case characters (or to distinguish between different type fonts). In the ZISC neuron, this approach is implemented with a local context Cxt stored in the neuron and a global context CXT held in a common register of the ZISC chip. Consequently, the context approach allows selecting neurons having learned with a determined context and inhibiting all others in ZISC ANN. During the recognition phase, the global context value is compared to the local context value stored in each neuron, and if found identical, the neuron will be selected, otherwise it will be inhibited. As a result, the context allows to configure the ZISC ANN either as a single neural network or as an arrangement of separate groups of neurons wherein all the neurons of a group have the same local context. Regarding the ZISCO36 neuron, the context (local or global) is a value coded on 7 bits. As a result, this context selection mechanism is such that the neurons having a local context different of the global context CXT, are inhibited during the recognition phase to participate to the selection of the closest one(s). However, this selection mechanism has no influence on the distance evaluation process, so that all the neurons will compute the distance between the input pattern and the stored prototypes in accordance with the equations mentioned above.

FIG. 1, consisting of FIGS. 1a and 1b, illustrates the conventional technique of signal (one-dimension space) and image (two-dimension space) analysis when ZISC neurons are used. FIG. 1a shows an electrical signal S (in volts), the amplitude thereof varies as a function of time. Assuming a sliding analysis window that considers seven consecutive sampling points, an input pattern will be represented by a vector having, e.g., seven components, representing the voltage values of seven consecutive sampling points. Consequently, each prototype will also be comprised of seven components. As apparent from FIG. 1a, at time n, vector $U_n$ is fully defined as soon as point A has been analyzed. During the recognition phase, when vector $U_n$ is inputted to ZISC ANN to be compared to all the prototypes stored in the neurons thereof, all the components of vector $U_n$ are broadcasted into the neurons to compute the distances therebetween. Finally, the minimum distance and the category are both determined. Likewise, at time n+1, vector $U_{n+1}$ is processed in the same manner, the sliding analysis window is shifted by a shift value equal to the sampling point. Note that the sampled signal measured at time n (point A) is fed seven times as a component into ZISC ANN, as it is fed in vectors $U_n, U_{n+1}, \ldots, U_{n+6}$, and this may be generalized to any sampling of electrical signals S.

FIG. 1b illustrates a similar example in the field of image processing using the same sliding analysis window. Referring to FIG. 1b, a sub-image I is shown wherein each input pattern is represented by a vector consisting of a block having, e.g., 7 by 7 pixels. In this case, each prototype consists of 49 components. By way of example, at time n, the 49 components of vector $U_n$ are fed into ZISC ANN for comparison with the prototypes. Next, at time n+1, the components of vector $U_{n+1}$ are first fed and, at time n+1+m, the components of vector $U_{n+1+m}$ are fed into ZISC ANN, where m represents the sub-image I width. As a result, each pixel of sub-image I is fed 49 times into ZISC ANN.

ZISC chips are usually packaged in electronic modules that are mounted on a printed circuit board that can be plugged in a Personal Computer (PC) through ISA or PCI buses. Since the computation power of a PC and ZISC ANN is greater than the data transmission rate, the bottleneck of the whole system resides in the communication between the PC (or a host computer) and the ZISC boards whereupon the ZISC chips are mounted. It is thus an important feature to ensure that the data transmission rate fully exploits the parallel processing capabilities of the ZISC technology. Referring to the signal and image analysis/processing illustrated in FIG. 1, the advantages affecting speed are not fully tapped because for each input pattern, each component must be fed several time into the ZISC ANN consuming a significant amount of time.

A likely solution consists to embed memory and microprocessor chips directly on the ZISC board, performing the analysis/processing task on the board itself after transferring the signal S or image I. This solution only displaces the problem without actually solving it. Moreover, even if it can be advantageously used for a stand alone system, it is too complex and expensive for a PC or a host computer.

SUMMARY OF THE INVENTION

It is therefore a primary object of the present invention to provide a method to improve the data transfer rate between a computer and an artificial neural network (ANN) constructed with ZISC chips/neurons.

It is another object of the present invention to improve the data transfer rate between a computer and an ANN constructed with ZISC chips/neurons to avoid duplication in the transmission of input pattern components therebetween.

It is still another object to improve the data transfer rate between a computer and an ANN constructed with ZISC chips/neurons that allow faster processing of the input patterns, thereby reducing the overall response time of the ANN.

It is yet another object to improve the data transfer rate between a computer and an ANN constructed with ZISC chips/neurons to fully exploit the parallel processing capabilities thereof.

In essence, the present invention is based on the ascertainment that in many ANNs applications a large number of neurons are available. To date, ZISC ANNs may incorporate up to hundreds of thousands ZISC neurons, where it often occurs that a large number thereof remain unused. In such instances, particularly, for specific applications where fast processing is essential, the present invention appears to be very advantageous.

According to one aspect of the present invention there is provided a method to improve the data transfer rate of input patterns, referred to as vectors, between a host computer and an artificial neural network (ANN) implemented in hardware during the recognition phase comprising the steps of: a) providing a plurality of vectors ($U_n$, . . . ) having q components, each vector being derived from the preceding by deleting the component at the first position and adding a new component at the last position; b) merging a set of k consecutive vectors into a single vector having p components, referred to as a base consolidated vector ($U'^*_n$), configured to globally represent the set of standard vectors, the base consolidated vector having all the components of the vectors, but only once, the first q components being formed by the components of first vector of the set, and the (p–q) remaining components being formed by the last component of the remaining vectors; c) providing an artificial neural network (ANN) configured as a combination of k sub-networks operating in parallel by way of a select command of the neurons comprising ANN, wherein each neuron stores at least p components; and d) creating a set of k consolidated vectors ($U_n$, . . . ) having p components derived from the base consolidated vector, wherein each consolidated vector has q components in common with the base consolidated vector, the (p–q) remaining components being valueless, the first q components of the first consolidated vector having a direct correspondence with the first q components of the base consolidated vector, the remaining components being not valuable, and continuing the process until the last consolidated vector has its q last components in direct correspondence with the q last components of the base consolidated vector, the first (p–q) components being valueless, wherein each consolidated vector is considered a prototype in a sub-network of ANN, with the first consolidated vector being stored in the first sub-network, continuing the process thereon until the last consolidated vector is stored in the last sub-network; and e) presenting a new base consolidated vector to each sub-network of ANN for recognition, wherein each sub-network analyses in parallel a portion of the base consolidated vector.

BRIEF DESCRIPTION OF THE DRAWINGS

The novel features believed to be characteristic of this invention are set forth in the appended claims. The invention itself, however, as well as other objects, aspects and advantages thereof, may be best understood by reference to the following detailed description of an illustrated preferred embodiment to be read in conjunction with the accompanying drawings.

FIG. 3 illustrates the process of consolidating prototypes to be compared with consolidated vectors when inputted to the ANN in the distance determination process, according to the present invention.

FIG. 4 shows the configuration of a ZISC ANN configured in a plurality of sub-networks, according to the present invention for the application illustrated in FIG. 2.

DESCRIPTION OF A PREFERRED EMBODIMENT

Primarily, the invention is a process of merging several input patterns into a single pattern that has been configured to globally represent the set of input patterns. To that end, a "base consolidated" vector representing a single input pattern is defined, that is capable of describing all the "standard" vectors representing the input patterns of the set. The base consolidated vector is provided with all the components of the standard vectors, but only once. In turn, a set of consolidated vectors is configured from the base consolidated vector, each corresponding to a standard vector. During the recognition phase, the base consolidated vector is inputted to a ZISC ANN now structured as a plurality of sub-networks operating in parallel. Each sub-network, which analyses a portion of the consolidated vector, is defined according to a sub-network label (the context value in the ZISC technology). In order to compute the distances with an adequate number of components, the stored prototypes must contain both valuable components (to be evaluated in the distance evaluation process) and inhibited components (not considered in the distance evaluation process). In the following description, these inhibited components will be referred to as the "don't care" components. After computing the distances in parallel, they are sorted, one sub-network at a time, to obtain the distances associated to each standard vector.

Figure 1A:
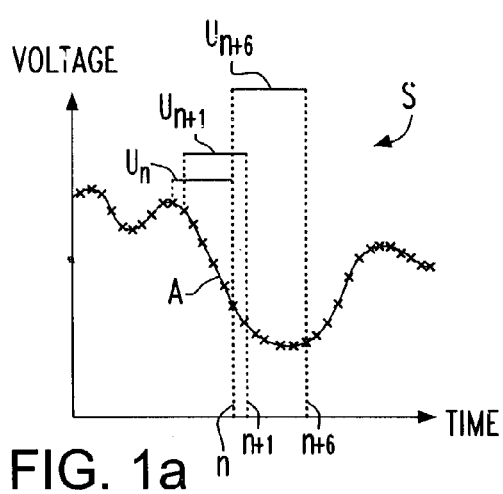
FIGS. 1a and 1b respectively illustrate standard signal and image analysis/processing.
Figure 2A:
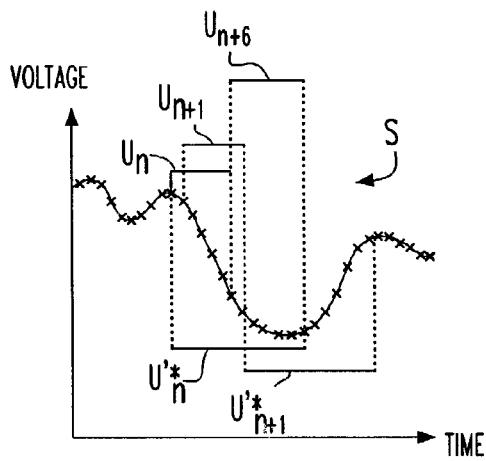
FIG. 2a–2c illustrate the method of the present invention as it applies to the signal analysis/processing depicted in FIG. 1a, where a base consolidated vector having thirteen components is configured to replace seven standard vectors having seven components each.

The basic principles will now be described in more detail by reference to FIGS. 2a–2c. It is to be noted that the preferred embodiment of the invention described hereinafter refers to an ANN constructed using ZISC neurons. Nevertheless, it is to be understood that the invention could be embodied using other types of parallel processors, provided they have the capability of inhibiting selected components. (Means equivalent to the "context" would also be adequate). FIG. 2a represents a signal S and standard vectors $U_n, \ldots, U_{n+6}$ shown in FIG. 1a that are to be compared with the prototypes stored in the ZISC ANN. A new vector $U'^*_n$ referred to hereinafter as the base consolidated vector is now defined. As apparent in FIG. 2a, it represents all the 13 sampling points of signal S pertaining to standard vectors $U_{n+1}$ to $U_{n+6}$, i.e., all the distinctive components of the standard input patterns but without duplication thereof.

Figure 2B:
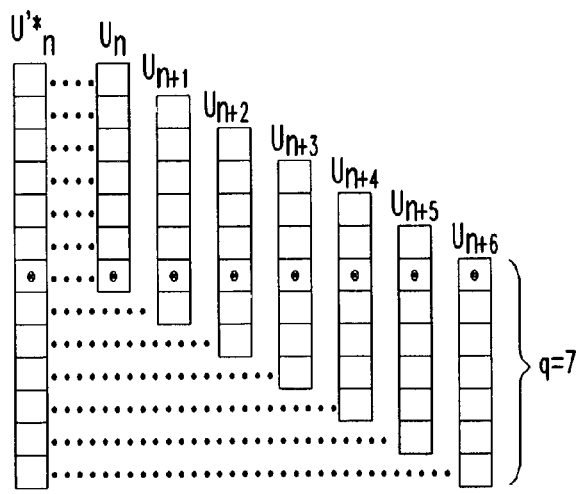

FIG. 2b illustrates the construction of the base consolidated vector $U'^*_n$. The q=7 components of standard vector $U_n$ form the first seven components of the base consolidated vector $U'^*_n$, with the six remaining consisting of the last component of each of standard vectors $U_{n+1}$ to $U_{n+6}$ for a total of p=13 components. The base consolidated vector $U'^*_n$ may represent each standard vector if certain components are adequately inhibited, as it will be now explained by reference to FIG. 2c.

Figure 2C:
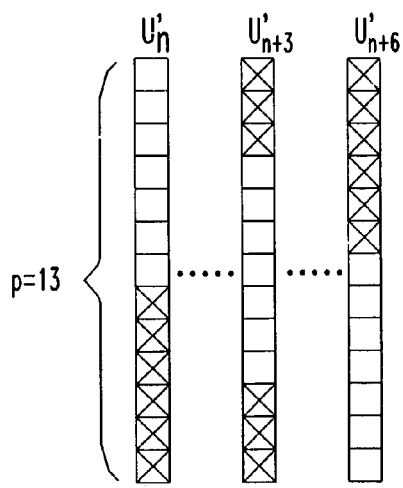

FIG. 2c illustrates the construction of consolidated vectors $U'_n, \ldots, U'_{n+6}$, derived from the base consolidated vector $U'^*_n$ to respectively represent standard vectors $U_n, \ldots, U_{n+6}$. In particular, it illustrates the use of "don't care" components in the base consolidated vector $U'^*_n$ to obtain derivatives of all the standard vectors $U_n$ to $U_{n+6}$. For instance, consolidated vector $U'_n$ is obtained from $U'^*_n$ to fill the first seven components with those of standard vector $U_n$ and the sixth remaining ones with "don't care". As apparent in FIG. 2c, standard vectors $U_n$, $U_{n+3}$ and $U_{n+6}$ are represented by their corresponding derivatives $U'_n$, $U'_{n+3}$, and $U'_{n+6}$ of the base consolidated vector $U'^*_n$.

FIGS. 2a–2c, describe the component coding mechanism, wherein a standard vector is transformed in a consolidated vector representing it. The use of the "don't care" function allows any standard vector to be represented by a corresponding consolidated vector. The generation of such consolidated vectors is performed on a PC or a host computer. During the learning phase, consolidated vectors, (e.g., $U'_n$), that are learned will be stored as prototypes (e.g., $P'_n$) having 13 components (7 with definite values and 6 "don't care"). During the learning phase, only base consolidated vectors, e.g., $U'^*_n$ are provided to ZISC ANN for recognition.

Figure 1B:
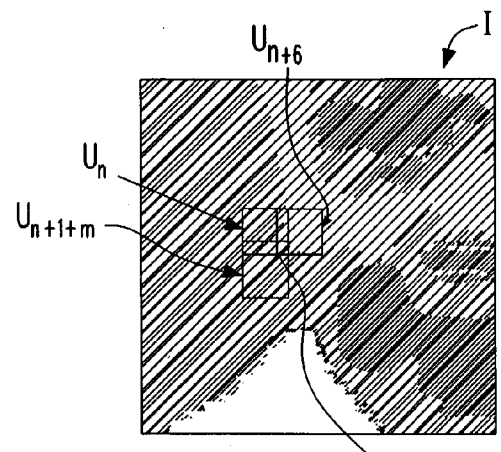

As a result of the particular construction described by reference to FIG. 2, any component of a consolidated vector, e.g., $U'_n$, is fed only once to ZISC ANN, instead of seven times as explained above by reference to FIG. 1, a significant advantage. However, the component coding mechanism leads to a major difficulty that needs to be overcome because consolidated vectors, e.g., $U'_n$, include more components than prototypes which would be normally stored in the neurons from standard vectors (e.g., 13 against 7 in the above example). Thus, they cannot be directly compared therewith during the course of the distance evaluation process. The solution to this problem will be now discussed with reference to FIG. 3.

FIG. 3 illustrates a general way of solving the problem raised by providing the base consolidated vector having p components as an input pattern to ZISC ANN consisting of neurons capable of storing at least p components. Let it be assumed, for sake of simplicity, that the number of components available in a neuron is equal to p. Let it be further assumed that the base consolidated vector, e.g., $V'^*_n$ $(V_{n,1}, \ldots, V_{n,p})$ is provided to ZISC ANN as an input pattern and that the first prototype to be stored (which results from the learning of a standard vector) is represented by P1 $(P_{i,1}, \ldots, P_{i,q})$. As of yet, ZISC ANN, built with ZISCO36 chips, is merely an arrangement of N neurons arranged linearly and when the first free neuron is engaged to store prototype P1, the q components are stored in the first q locations of the RAM memory. (The contents of the (p–q) remaining locations are not relevant in the distance evaluation process.) According to the present invention, the solution requires a double action. The first consists in defining the construction of consolidated prototypes having p components, among which q are valuable. It will be thus necessary to code prototype P1 in several consolidated prototypes $P'_1 1, \ldots P'_{p-q+1} 1$, as shown in FIG. 3. Storing prototype P1 having q components now implies storing (p–q+1) prototypes, each having p components. The solution, thus, consumes a large number of neurons. In each consolidated prototype, components that are not used are set as "don't cares". Therefore, the number of "don't care" equals the difference between the number p of components of the consolidated vector and the number q of components of the standard vector, i.e., (p–q). The second action concerns the restructuring of the ZISC ANN into a plurality of sub-networks using the context command. For instance, consolidated prototype $P'_i 1$ is to be provided to sub-network i. The first free neuron of sub-network i will thus 'learn' consolidated prototype $P'_i 1$, which is compared to the base consolidated vector $V'^*_n$ when it is provided as an input pattern to ZISC ANN during the recognition phase. The number of sub-networks is equal to the difference between the number of components of the consolidated vector and the number of components of the standard vector plus 1, i.e. equal to (p–q+1). This number of sub-networks may be chosen by the user or computed by the PC (or the host computer).

A common format between the consolidated vectors and consolidated prototypes exists such that any distance Dist may be evaluated using one of the above mentioned distance relations. Considering the example described above by reference to FIG. 2, each standard vector U (e.g., $U_n$) having q=7 components is represented by a consolidated vector U' (e.g. $U'_n$) having p=13 components derived from the base consolidated vector $U'^*_n$. Assuming an ANN comprised of N ZISC neurons, each neuron being capable of storing prototypes having at least p=13 components. FIG. 4 represents ZISC ANN referenced 10, that is virtually configured to include p–q+1=7 sub-networks (11-1 to 11-7). Each sub-network, e.g., 11-1, consists of r neurons, e.g., 12-1 to 12-r, these parameters meeting the relation $N=(p-q+1)r$. In the learning phase, it is assumed that a consolidated vector, e.g., $U'_n$, is the likely candidate. It will be considered in the first free neuron of sub-network 11-1 as a consolidated prototype $U'_n$. Consolidated vector $U'_{n+1}$ will be considered in the first free neuron of sub-network 11-2, and the like, till $U'_{n+6}$, that will be assigned in the first free neuron of sub-network 11-7. During the recognition phase, let it be assumed that the base consolidated vector, e.g., $U'_n$, is provided to ZISC ANN 10. First sub-network 11-1 analyses the first seven components thereof (because it is compared with consolidated prototype $P'_n$), second sub-network 11-2 analyses the seven consecutive components starting at the second one, etc., till sub-network 11-7 which analyzes the last seven components. As a result, vector $U'^*_n$ is provided to ZISC ANN instead of 7 vectors, i.e. $U'_n, \ldots, U'_{n+6}$. The data transfer rate is thus reduced by a factor of seven, at a cost of using 7 neurons having 13 components instead of 1 neuron having 7 components.

Figure 5:
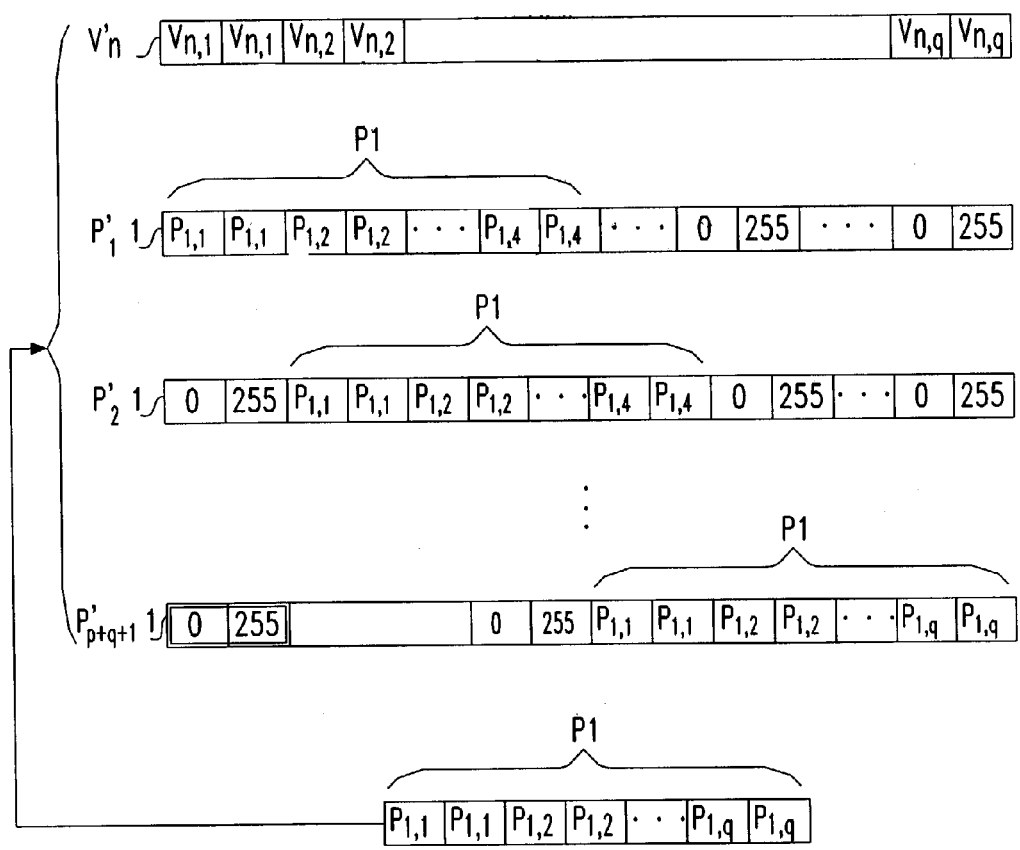
FIG. 5 illustrates the process of consolidating prototypes in the particular case where Z15C036 chips are used.

Thus, ZISC ANN is virtually reconfigured into a plurality k of sub-networks operating in parallel to allow the simultaneous distance computation (each neuron computing its own distance Dist). Each sub-network analyzing portion of the base consolidated vector defined according to a sub-network label, i.e., the context value in the case of a ZISC036 chip. After all the distances have been computed in parallel for all sub-networks, each sub-network determines the minimum distance from among its own neurons, so that the minimum distance associated to each standard vector becomes available. It is to be noted that all distances are computed in parallel, i.e., simultaneously, but the minimum distances are outputted in sequence one sub-network after another (e.g., at each shifting value of the sliding analysis window). Since the ZISCO36 neuron does not include the feature of inhibiting a component, this can be accomplished by allowing two components to code a "don't care" condition. As apparent from FIG. 5, all the components of the base consolidated vector are duplicated (and thus, all the components of the consolidated prototypes). As result, any component will be represented by two identical values, except the "don't care" components that are coded with two different specific values. The first value is set to the minimum value 0, and the second one to the maximum value (255) that can be reached by a component. As a result, in the distance evaluation process, a particular pair of values will always produce the same distance result whatever the pair of identical values are stored as a component in the base consolidated vector, thereby justifying the notion of "don't care". In the present application, substraction of the offset is not required since all prototypes have the same number of "don't care" components.

Figure 6:
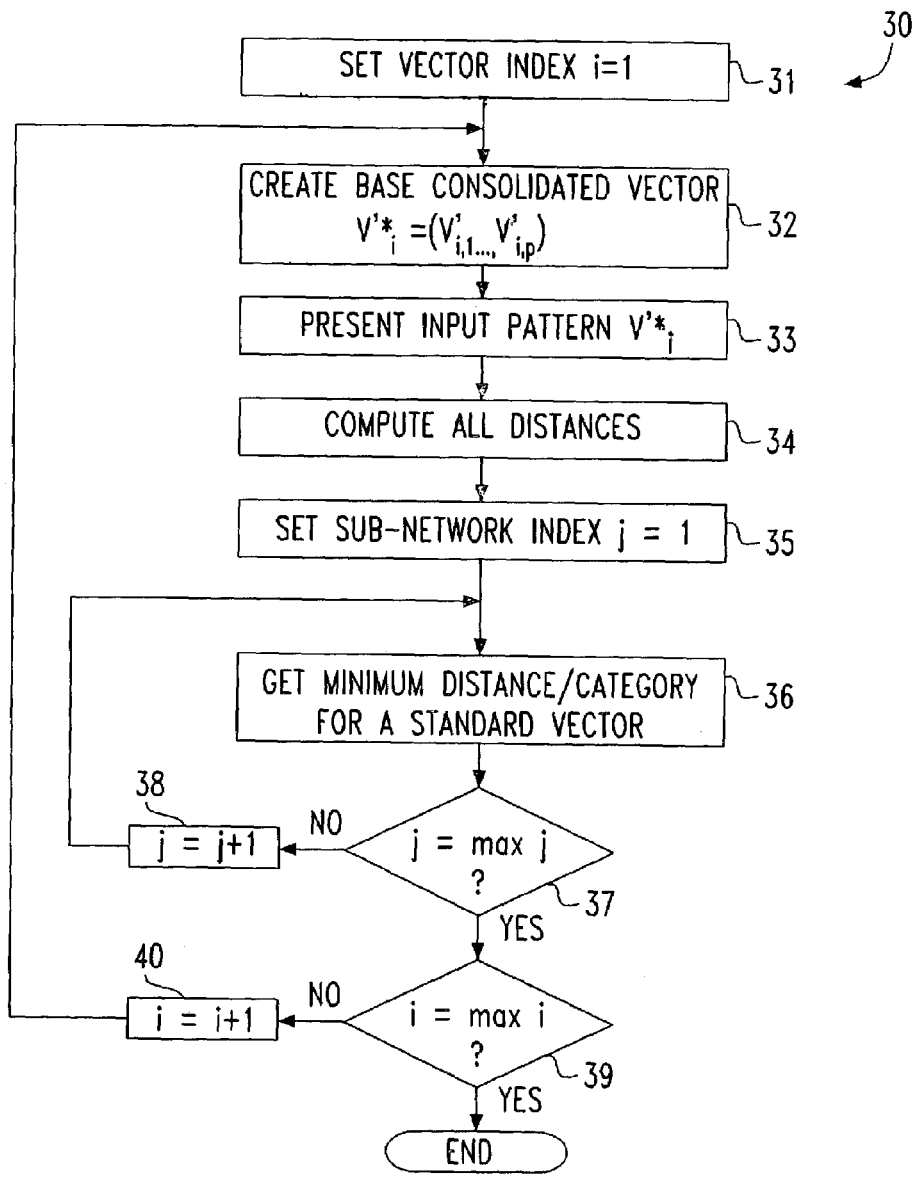
FIG. 6 is a flow chart showing the algorithm that describes the essential steps of the method of the present invention.

FIG. 6 illustrates algorithm 30 to obtain the minimum distances and associated categories when a consolidated vector, e.g., $V'^*_i$, is provided to ZISC ANN 10 as an input pattern during the recognition phase. At initialization, index i (index of the base consolidated vector) that is to be inputted is set to 1 (step 31). Next, vector $V'^*_i$ is created as described above by reference to FIG. 2, i.e., components $V'_{i,i}$ to $V'_{i,p}$ are extracted (step 32). Then, vector $V'^*_i$ is fed to ZISC ANN 10 (step 33) and all distances are computed in the neural network, in accordance with the aforementioned equations (step 34). Sub-network index j is then set to 1 (step 35). The distances corresponding to the neurons belonging to this sub-network are used to determine the minimum distance (step 36). A test is performed to detect whether or not j has reached its maximum value (step 37), i.e., whether all the sub-networks have been analyzed. If j has not reached its maximum value, index j is incremented by 1 (step 38) and the last three steps (steps 36 to 37) are repeated; otherwise, if j reaches the maximum value, a new test is performed to detect whether or not i has reached the maximum value, i.e., indicative that all the base consolidated vectors have been analyzed (box 39). If i has not reached the maximum, index i is incremented by 1 to select the next consolidated vector (step 40) and the last seven steps (steps 32 to 39) are repeated for the next base consolidated vector. Otherwise, if i reaches the maximum, the process stops.

While the invention has been particularly described with respect to a preferred embodiment thereof it should be understood by those skilled in the art that the foregoing and other changes in form and details may be made therein without departing from the spirit and scope of the invention, all of which fall within the scope of the appended claims.

What is claimed is:

1. A method for improving the data transfer rate of input patterns, referred to as vectors, between a host computer and an artificial neural network (ANN) implemented in hardware during a recognition phase comprising the steps of:
  a) providing a set of vectors (Un, . . . ) having q components;
  b) merging a set of k consecutive vectors into a single vector having p components, referred to as a base consolidated vector ($U'^*_n$), configured to globally represent said set of vectors, said base consolidated vector having only once all the components of the vectors, the first q components being formed by the components of first vector of said vector set, the (p–q) components consisting of the last component of the remaining vectors;
  c) providing an artificial neural network (ANN) configured as a combination of k sub-networks operating in parallel, each neuron storing at least p components;
  d) creating a set of k consolidated vectors ($U'^*_n, \ldots,$) having p components derived from said base consolidated vector, wherein each consolidated vector has q components in common with the base consolidated vector, the (p–q) remaining components being assigned a don't care condition, the first q components of the first consolidated vector having a direct correspondence with the first q components of the base consolidated vector, with the remaining components remaining as don't care, and repeating the process until the last consolidated vector which has its q last components in direct correspondence with the q last components of the base consolidated vector, the first (p–q) components having a don't care condition; and
  e) presenting a new base consolidated vector to each sub-network of said ANN for recognition, wherein each of said sub-networks analyses in parallel a portion of said base consolidated vector.

2. The method as recited in claim 1, wherein step a) each vector is derived from the preceding one by deleting the component at the first position and adding a new component at the last position.

3. The method as recited in claim 1, wherein step c) the artificial neural network (ANN) is configured as a combination of k sub-networks operating in parallel by a select command of the neurons comprising said ANN.

4. The method as recited in claim 1, wherein step d) each consolidated vector becomes a prototype of said sub-network of said ANN.

5. The method as recited in claim 4, wherein the first consolidated vector is stored in the first sub-network, and continuing the process until the last consolidated vector is stored in the last sub-network.

* * * * *